Aug. 12, 1969     F. S. BRILES     3,460,410
REAMER
Original Filed Aug. 28, 1964
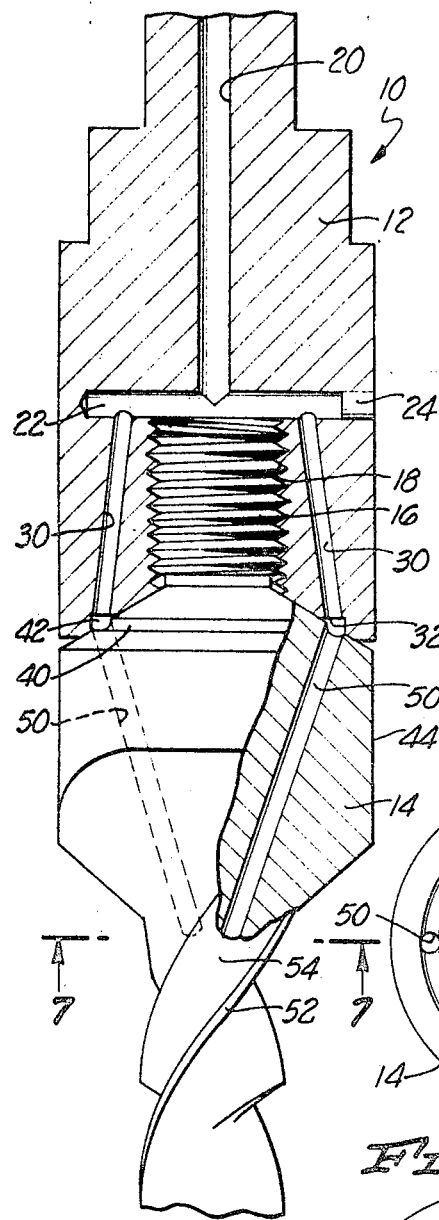
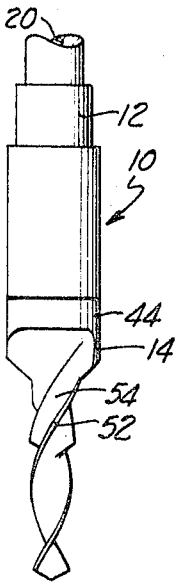
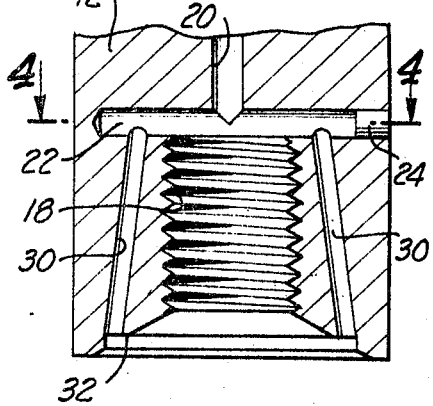
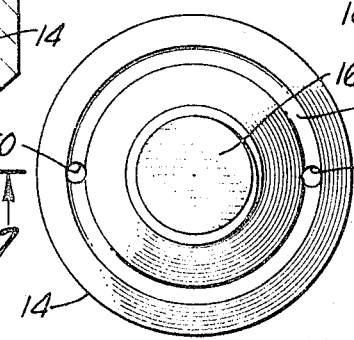
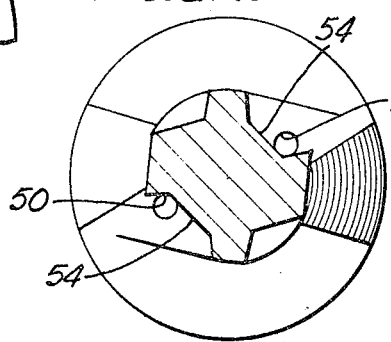
INVENTOR.
FRANKLIN S. BRILES
BY
MAHONEY, HALBERT &
HORNBAKER
ATTORNEYS United States Patent Office 3,460,410
Patented Aug. 12, 1969

3,460,410
REAMER
Franklin S. Briles, 6 Middleridge Lane N.,
Rolling Hills, Calif. 90274
Continuation of application Ser. No. 392,808, Aug. 28, 1964. This application Aug. 7, 1967, Ser. No. 660,564
Int. Cl. B23b 51/06
U.S. Cl. 77—72                                 8 Claims

ABSTRACT OF THE DISCLOSURE

System for delivering coolant or lubricant along the cutting edges of a tapered reamer. The reamer and a threadedly connected spindle define an annular canal therebetween to which fluid is supplied through the spindle. Bores in the reamer body connect with and receive fluid from this canal regardless of the orientation between reamer and spindle, discharging the fluid into the upper ends of the reamer flutes generally lengthwise and with a radially inwardly directed component serving to hold fluid in the flutes along their lengths despite the coverging reamer taper and centrifugal force.

Cross-reference to related application

This application is a continuation of my co-pending application Ser. No. 392,808, filed Aug. 28, 1964, for Reamer and now abandoned.

Background of the invention

This invention relates generally to the reamer art, and it relates more particularly to means for delivering a coolant or lubricant to the entire lateral cutting edges of a tapered reamer.

In recent years, and notably in the aircraft industry, tapered fastening has become of increasing importance. In tapered fastening, a stud or bolt having a tapered shank is inserted into a tapered bore in workpieces to be fastened. In such operations, the diameter of the tapered bore is somewhat less than the diameter of the tapered shank of the stud or bolt so that, as the stud or bolt is driven or drawn home, the workpieces are prestressed about the area of the bolt so that fatigue is eliminated.

For optimum results, the tapered bore must be precisely produced to match the taper of the shank of the stud or bolt so that prestress may be obtained throughout the entire thickness of the workpieces, and this precision is attained by careful reaming of the bores.

However, difficulties, particularly in a tapered reaming operation, occur especially when fastening of extremely hard materials, such as those used in modern aircraft or missile construction, is to be accomplished because the high speed reamer, in forming the tapered bore, often becomes frictionally overheated and often breaks.

Summary of the invention

To overcome these limitations, it is an object of the present invention to provide a tapered reamer assembly which incorporates means for delivering a coolant or lubricant to the lateral cutting areas of the reamer throughout substantially the entire operative length of the reamer so that frictional overheating may be eliminated.

It is a further object of the invention to provide such a reamer assembly in which delivery of the coolant or lubricant from the spindle to the reamer body may be readily accomplished without precise adjustment of the position of the reamer relative to the spindle.

It is another object of the invention to provide such a reamer assembly in which the effective means for delivering the coolant or lubricant are easily and inexpensively formed with a minimum of machine tool operations.

With these and other objects in view, the invention consists of the construction, arrangement and combination of the various elements of the device whereby the objects contemplated are attained, as hereinafter set forth, pointed out in the appended claims, and illustrated in the accompanying drawings, in which:

Brief description of the drawings

FIG. 1 is a side elevational view of a tapered reamer assembly according to the invention;

FIG. 2 is an enlarged, fragmentary vertical sectional view of the tapered reamer assembly of FIG. 1, partially in elevation;

FIG. 3 is a view similar to FIG. 1 but showing only the spindle element of the reamer assembly;

FIG. 4 is a cross-sectional view taken on the line 4—4 of FIG. 3;

FIG. 5 is an end elevational view of the spindle element of the reamer assembly viewed in FIG. 3;

FIG. 6 is an end elevational view of the reamer element of the reamer assembly; and FIG. 7 is a cross-sectional view taken on the line 7—7 of FIG. 1.

Detailed description

A reamer assembly generally designated 10, has a spindle element 12 and a reamer element 14. The reamer element 14 has tapered cutting edges so as to produce a tapered bore in a workpiece. The reamer 14 has a threaded stud 16 mounted on the vertical axis thereof and extending upwardly therefrom, the threaded stud 16 being receivable in a mating threaded bore 18 in the spindle 12.

The spindle 12 has an internal tubular passage or canal 20 vertically, axially formed therein. The canal 20 extends from the top surface of the spindle 12 to a point adjacent the upper, closed end of the bore 18, at which point it intersects a tubular, internal horizontally disposed passage or canal 22 which, for convenience in manufacture, may be formed by drilling from one side of the spindle 12 and then closed, as by a plug 24. Fluid passage from the canal 20 to the canal 22 is thus established.

A pair of tubular, internal passages or canals 30 connect with the canal 22 and depend therefrom, the canals 30 being disposed on opposite sides of the bore 18. Preferably, the canals 30 slant downwardly and outwardly from the canal 22. The canals 30 terminate at an annular, grooved opening 32 formed adjacent to the bottom of the spindle 12.

Formed adjacent the top of the reamer 14 is an annular groove 40 which is disposed so that, when the spindle 12 is mounted on the reamer 14, the groove 40 and the grooved opening 32 will define a tubular, annular passage or canal 42 having fluid passage connection with the canals 30.

Opening into the canal 42 and proceeding downwardly and radially inwardly therefrom within the body portion 44 of the reamer 14 is a pair of internal tubular passages or canals 50 disposed on opposite sides of the body portion 44.

The reamer 14 has helical, tapered cutting edges 52 and flutes 54 therebetween, and the canals 50 open into the flutes 54 closely adjacent to the point at which the flutes 54 terminate at the body portion 44 of the reamer 14. Thus, the reamer 14 comprises the body 44 and tapered cutting means projecting therefrom in the form of helical cutting edges 52 and flutes 54.

In use, the reamer 14 is threadedly mounted on the spindle 12 and tightened thereon until the tubular canal 42 is formed. A source of coolant or lubricant (not shown) is connected to the canal 20 at the top of the spindle 12. The reamer 14 is then inserted into a bore in the workpiece to be reamed, and the assembly of the spindle 12 and the reamer 14 is rotated for the reaming operation.

As the reaming operation commences, pressure is applied to the coolant or lubricant, and the coolant or lubricant under pressure will then pass through the canal 20, the canal 22, the canals 30, the canal 42, and the canals 50 and be spewed out, under pressure, into the flutes 54 in a generally lengthwise direction with a radially inwardly directed component so that a substantial portion of the fluid will remain in the flutes 54 along the entire length thereof. It will thus be seen that the coolant or lubricant will be effectively applied to the cutting edges 52 along the entire length thereof so that full lateral cooling or lubrication is attained along the entire cutting section of the reamer.

It will also be seen that because the canal 42 is annular, the canals 50, leading from the canal 42, need not be aligned with the canals 30 which supply coolant or lubricant to the canal 42, because coolant or lubricant delivered from the canals 30 will fill the annular canal 42, and the openings of the canals 50 may be disposed at any points along the annular canal 42, and not necessarily in alignment with the canals 30.

Although the invention has been herein shown and described in what is conceived to be the most practical and preferred embodiment thereof, it is recognized that departures may be made therefrom within the scope of the invention, which is not to be limited to the details disclosed herein, but is to be accorded the full scope of the claims so as to embrace any and all equivalent structures and devices.

I claim:

1. A reamer assembly which comprises a spindle; a tapered reamer having a body, tapered cutting means projecting from the body and tapering from a relatively large diameter upper end proximate the body to a relatively small diameter lower end remote from the body; axially aligned, threaded coupling means on said spindle and said reamer body connecting the tapered reamer to the spindle, opposed, generally complementary annular surface on said spindle and reamer body, annular groove means in at least one of said annular surfaces and located radially outwardly from said threaded coupling means, said annular surfaces mating in surface-to-surface engagement when said threaded coupling means is fully engaged so that said annular groove means forms an annular internal canal in said reamer assembly, fluid passage means in said spindle communicating with said annular canal for delivering fluid under pressure to said canal, and fluid conduit means in said reamer body having an inlet opening at said annular canal for receiving fluid under pressure from said canal and terminating at a discharge orifice located in the upper end of one of said flutes, said discharge orifice being directed generally lengthwise down said one flute.

2. A tapered reamer as defined in claim 1, wherein one of said discharge orifices is disposed in the upper end of each of said flutes.

3. A tapered reamer as defined in claim 2, wherein the generally lengthwise direction of each of said orifices has a radially inwardly directed component down the respective flute.

4. A tapered reamer as defined in claim 3, wherein said fluid conduit means in the reamer body comprises a plurality of substantially straight bores, a respective one of said bores providing direct communication between said annular canal and each of said orifices and the lower ends of said bores defining the respective said orifices, said bores converging from their upper ends at said annular canal toward their lower ends at said orifices to provide said orifices with said radially inwardly directed component.

5. A tapered reamer as defined in claim 1, wherein said annular surfaces are frusto-conical.

6. A tapered reamer as defined in claim 3, wherein said frusto-conical annular surface on the spindle is concave and the frusto-conical annular surface on the reamer body is convex.

7. A tapered reamer as defined in claim 4, wherein said threaded coupling means comprises a threaded stud projecting from said reamer body and a threaded bore in said spindle.

8. A reamer assembly which comprises: a spindle having an axially aligned, threaded bore formed at one end thereof, a reamer having a body portion and helical cutting edges and flutes, said reamer having an axially aligned, threaded stud mounted on the body portion and mateably receivable in the bore in the spindle for mounting the reamer on the spindle; an axially aligned, tubular canal opening at the other end of the spindle and terminating within the spindle adjacent the closed end of the bore, a transverse tubular canal within the spindle intersecting and connected to the axially aligned canal, an arcuate internal canal defined by a groove in at least one of the abutting surfaces of the spindle and reamer, a tubular canal disposed within the spindle laterally of the bore and intersecting the transverse canal and the arcuate canal, and a plurality of tubular canals disposed within the body of the reamer, said last mentioned of canals being connected to the arcuate canal and terminating adjacent the intersection of the flutes and the body portion of the reamer, said series of canals being disposed so that, upon introduction of fluid under pressure into the open end of the axially aligned canal in the spindle, said fluid under pressure will pass through the series of canals and will be spewed over substantially the entire length of the flutes and cutting edges of the reamer.

References Cited
UNITED STATES PATENTS

| | | | |
|---|---|---|---|
| 716,441 | 12/1902 | Latham | 77—65 |
| 1,746,716 | 2/1930 | Sasse | 77—68 XR |
| 2,010,257 | 8/1935 | Fehse | 77—72 XR |
| 2,237,901 | 4/1941 | Chun | 77—68 |
| 3,216,107 | 11/1965 | Andreasson | 77—72 XR |

FRANCIS S. HUSAR, Primary Examiner

U.S. Cl. X.R.

77—68